United States Patent
Li et al.

(10) Patent No.: US 10,329,490 B2
(45) Date of Patent: Jun. 25, 2019

(54) METHOD OF AND SYSTEM FOR PRODUCING SOLID CARBON MATERIALS

(71) Applicant: Curtin University, Bentley, Western Australia (AU)

(72) Inventors: Chun-Zhu Li, Bentley (AU); Xun Hu, Bentley (AU)

(73) Assignee: Curtin University, Bentley, Western Australia (AU)

( * ) Notice: Subject to any disclaimer, the term of this patent is extended or adjusted under 35 U.S.C. 154(b) by 0 days.

(21) Appl. No.: 15/565,262

(22) PCT Filed: Apr. 13, 2016

(86) PCT No.: PCT/AU2016/000133
§ 371 (c)(1),
(2) Date: Oct. 9, 2017

(87) PCT Pub. No.: WO2016/164965
PCT Pub. Date: Oct. 20, 2016

(65) Prior Publication Data
US 2018/0057752 A1    Mar. 1, 2018

(30) Foreign Application Priority Data

Apr. 13, 2015   (AU) ................. 2015901314

(51) Int. Cl.
*C10B 57/06*     (2006.01)
*C01B 32/05*     (2017.01)
(Continued)

(52) U.S. Cl.
CPC ............... *C10B 57/06* (2013.01); *B01J 6/008* (2013.01); *B01J 19/0013* (2013.01);
(Continued)

(58) Field of Classification Search
CPC combination set(s) only.
See application file for complete search history.

(56) References Cited

U.S. PATENT DOCUMENTS

| 6,057,262 A | 5/2000 | Derbyshire et al. |
| 2010/0098615 A1* | 4/2010 | Tennison ............ C08F 2/18 423/445 R |
| 2011/0056125 A1* | 3/2011 | Antonietti ......... C10B 53/02 44/605 |

FOREIGN PATENT DOCUMENTS

| EP | 2845842 A1 | 3/2015 |
| WO | 9929812 A1 | 6/1999 |

(Continued)

OTHER PUBLICATIONS

International Search Report and Written Opinion for International Application No. PCT/AU2016/000133, dated May 11, 2016, 9 pages.

(Continued)

*Primary Examiner* — Ellen M McAvoy
*Assistant Examiner* — Chantel L Graham
(74) *Attorney, Agent, or Firm* — Michael Best & Friedrich LLP

(57) ABSTRACT

The present disclosure provides a method of producing a solid carbon material. The method comprises providing a carbon-containing material formed through the heat treatment of carbonaceous feedstock. The carbon-containing material is capable of undergoing polymerisation. The method further comprises mixing the carbon-containing material with a polymerisation agent to form a material mixture. In addition, the method comprises heating the material mixture to a temperature at which polymerisation of the material mixture occurs so as to produce the solid carbon material. The method also comprises adding a further material into the material mixture before polymerisation.

16 Claims, 4 Drawing Sheets

(51) Int. Cl.
*B01J 6/00* (2006.01)
*B01J 19/00* (2006.01)
*C10B 53/02* (2006.01)
*C10L 5/14* (2006.01)
*C10L 5/44* (2006.01)
*C10L 9/08* (2006.01)
*C10L 9/10* (2006.01)

(52) U.S. Cl.
CPC .............. *C01B 32/05* (2017.08); *C10B 53/02* (2013.01); *C10L 5/14* (2013.01); *C10L 5/447* (2013.01); *C10L 9/08* (2013.01); *C10L 9/10* (2013.01); *B01J 2219/00112* (2013.01); *B01J 2219/00117* (2013.01); *Y02E 50/10* (2013.01); *Y02E 50/14* (2013.01); *Y02E 50/30* (2013.01); *Y02P 20/145* (2015.11)

(56) References Cited

FOREIGN PATENT DOCUMENTS

WO  2009127727 A1  10/2009
WO  2013180565 A1  12/2013

OTHER PUBLICATIONS

Hu, B. et al., "Engineering Carbon Materials from the Hydrothermal Carbonization Process of Biomass", Adv. Mater, 2010, vol. 22, pp. 1-16.

Achilias et al., "Chemical Recycling of Poly(Methyl Methacrylate) by Pyrolysis. Potential use of the Liquid Fraction as a Raw Material for the Reproduction of the Polymer," European Polymer Journal, 2007; 43(6)2564-2575.

Achilias et al., "Chemical Recycling of Polystyrene by Pyrolysis: Potential Use of the Liquid Product for the Reproduction of Polymer," Macromolecular Materials and Engineering, 2007; 292(8):923-934.

Qiao et al., "Carbon Fibers and Films Based on Biomass Resins," Energy & Fuels, 2005; 19(6):2576-2582.

Wang et al., "Formation of Coke During the Pyrolysis of Bio-Oil," Fuel, 2013; 108:439-444.

Australian Patent Office Examination Report for Application No. 2016247571 dated Aug. 10, 2018, 8 pages.

European Patent Office Search Report for Application No. 16779325.6 dated Sep. 5, 2018, 14 pages.

New Zealand Patent Office Examination Report for Application No. 735444 dated Sep. 25, 2018, 5 pages.

* cited by examiner

METHOD OF AND SYSTEM FOR PRODUCING SOLID CARBON MATERIALS

FIELD OF THE INVENTION

The present invention relates to a method of and a system for the production of solid carbon materials.

BACKGROUND OF THE INVENTION

Carbonaceous feedstock such as coal and petroleum can be used to produce solid carbon materials. For example, coking coal, coal tar and coal tar pitch are typically used to produce the metallurgical coke or other types of carbon materials for the iron and steel industry or to produce the electrodes for the aluminium industry. However, a number of problems exist with the above-mentioned production of carbon materials.

In particular, some currently used raw feedstock, such as coking coal, is non-renewable and depleting. Coking coal represents only a small portion of available coal reserves. Unfortunately, other coals of lower or higher ranks than the coking coal, e.g. lignite, brown coal, sub-bituminous coal, low-caking bituminous coals and anthracite, do not possess the required caking properties to be suitable feedstock for making metallurgical coke.

Furthermore, the use of the carbon materials in the way described above leads to a significant emission of $CO_2$ and other pollutants such as $SO_2$ and $NO_x$. In addition to the high sulphur content in the metallurgical coke produced from coking coal or petroleum, the ash yield is also relatively high, which creates many issues in their application in metallurgical industry.

In addition to the metallurgical industry, solid carbon materials with high strength are also required in other industries, e.g. wastewater treatment and gold mining and extraction. The solid carbon materials (e.g. activated carbon) must have good mechanic strength for use in these operations.

Biomass is the only renewable resource that can be directly used to make solid carbon materials. However, biomass-derived carbon materials are usually of insufficient quality to be a replacement for solid carbon materials such as metallurgical coke and high-strength activated carbon.

There is a need for high quality solid carbon materials produced from biomass or other relatively inexpensive low-caking carbonaceous feedstock.

SUMMARY OF THE INVENTION

In accordance with a first aspect of the present invention, there is provided a method of producing a solid carbon material, the method comprising:
  providing a carbon-containing material formed through the heat treatment of carbonaceous feedstock, the carbon-containing material being capable of undergoing polymerisation;
  mixing the carbon-containing material with a polymerisation agent to form a material mixture; and
  heating the material mixture to a temperature at which polymerisation of the material mixture occurs so as to produce the solid carbon material.

Embodiments of the present invention have significant advantages. In particular, the produced solid carbon material may have a relatively high density and hardness. In some instances, the produced carbon material, particularly after further treatment (i.e. carbonisation), has properties similar to metallurgical coke produced from coking coal. Furthermore, the produced solid carbon material may have a relatively low sulphur content and a relatively low ash yield compared to metallurgical coke produced from coking coal.

The term "carbonaceous feedstock", as used herein, is intended to include a variety of carbon-containing renewable and non-renewable feedstock including but not limited to coal (its full coalification rank spectrum from peat, lignite, brown coal, sub-bituminous coal, bituminous coal, semi-anthracite to anthracite), biomass, solid wastes or their mixtures. The solid wastes may include but are not limited to agricultural wastes, forestry wastes and domestic wastes or residues from the processing of carbonaceous feedstock.

The term "polymerisation", as used herein, is intended to include within its scope, in addition to the polymerization of a monomer alone, copolymerisation, e.g. the polymerisation of two or more different monomers. Furthermore, the term "polymerisation" should be understood as comprising not only the formation of polymer chains by bonding monomers or prepolymers to one another but also the formation of a three-dimensional network by the establishment of bonds among these polymer chains, which is commonly known as crosslinking.

The term "carbon-containing material", as used herein, is intended to include within its scope a material or a material composition comprising carbon as the main element and other elements such as hydrogen and oxygen. For example, the carbon-containing material may be derived from the pyrolysis of carbonaceous feedstock, such as biomass or coal.

The term "polymerisation agent", as used herein, is intended to include within its scope one or more components which are added to a polymerisable material to cause or accelerate polymerisation. Thus, the term "polymerisation agent" is intended to be inclusive of materials that act as cross-linking agents, initiators, accelerators, promoters and the like. The term "induce", as used herein, is used to include any or all of these functions of the polymerisation agent.

The method may be conducted and the polymerisation agent may be selected such that, after polymerisation, the polymerisation agent forms a part of the produced solid carbon material. The polymerisation agent may be produced from the hydrolysis or other means of thermal treatment of the carbonaceous feedstock. A person skilled in the art will appreciate that a range of components may be produced from the hydrolysis of biomass, which individually or as a mixture can be used as a polymerisation agent.

In an embodiment, the polymerisation agent comprises a material having a furan ring, a carbonyl group and/or other reactive functional groups. For example, the polymerisation agent may comprise furfural, hydroxyl acetone, furfural alcohol or their mixtures. The polymerisation agent may be obtained from the hydrolysis, liquefaction or pyrolysis of carbonaceous feedstock.

In one embodiment, the carbon-containing material may be provided in the form of a liquid.

In a further embodiment, the carbon-containing material may be condensable.

In a specific embodiment, the carbon-containing material comprises a flowable liquid or non-flowable paste. The carbon-containing material may comprise crude, such as bio-crude, which may be bio-oil. In this regard, the carbon-containing material may be produced through the pyrolysis, hydrothermal treatment or liquefaction of the biomass using a variety of ways known to those skilled in the art. Other suitable carbonaceous feedstock may include municipal waste, coal such as peat, lignite, brown coal, sub-bituminous coal and low-rank bituminous coal and mixtures thereof.

In an embodiment, the method comprises a step of mixing the carbon-containing material with a further material. It will be appreciated that this mixing step may be performed together with the step of mixing the carbon-containing material with the polymerisation agent.

In a specific embodiment, the further material has pores. For example, the further material may comprise carbonaceous particles, such as fine particles from coal or biomass or char obtained from the thermal treatment of carbonaceous feedstock such as biomass, peat, lignite, brown coal, sub-bituminous coal, low-rank bituminous coal or mixtures thereof. However, a person skilled in the art will appreciate that other suitable further materials are envisaged.

If the material and the polymerisation agent are mixed with a porous material, at least some polymerisation of the carbon-containing material and the polymerisation agent may take place within the pores of the further material. Thus, the pores of the further material may be filled with solidified carbon material.

Additionally or alternatively, the further material may comprise an organic or inorganic additive to produce a solid carbon material composite. For example, an inorganic salt may be added to the material mixture to produce a carbon metal composite. A person skilled in the art will appreciate that other suitable additives are envisaged.

The step of mixing the carbon-containing material and the polymerisation agent may be conducted at approximately room temperature or at an elevated temperature.

The step of mixing the material and the polymerisation agent may be conducted to form a slurry.

In an embodiment, the material mixture is heated to an elevated temperature so as to induce polymerisation. The elevated temperature may be selected such that it is (just) sufficient for polymerisation to take place at a rate that is of commercial significance, but may be sufficiently low such that the formation of gaseous products during the polymerisation and consequently the formation of pores in the produced solid carbon material can be minimized.

In an embodiment, the step of heating the material mixture is conducted in a step wise manner. For example, the temperature may be increased gradually at different heating rates and with various holding periods at selected temperature levels.

The step of heating the material mixture to induce the polymerisation may be conducted under atmospheric pressure. However, other conditions are envisaged, such as under the vapour pressure of the reactants.

In an embodiment, the step of heating the material mixture to induce the polymerisation of the material is conducted in an inert environment, i.e. oxygen-deficient.

The method may further comprise a step of heating (carbonising) the solid carbon material to a temperature sufficient to devolatilise the solid carbon material. In this regard, the produced carbon material may be heated to a temperature of a similar magnitude to that for the production of metallurgical coke or even higher temperatures to make high quality specialised carbon materials such as electrodes for the aluminium industry. For example, the produced solid carbon material may be heated to a temperature between 400° C. to 1500° C.

In an embodiment, the solid carbon material may have high strength with superior capacity for the adsorption/absorption of various organic compounds and inorganic metals. In this specific application, there may be no need to carbonise the solid carbon material.

The steps of polymerisation and carbonising the produced solid carbon material may be repeated one or more times in an alternating manner to further increase the density of the produced solid carbon material.

In an embodiment, the method comprises a step of providing a catalyst to increase the rate of the polymerisation of the material mixture. For example, the catalyst may be added to the material mixture. Alternatively, the catalyst may be contained within at least one of: the carbon-containing material, the polymerisation agent and the further material. For example, the acids in the carbon-containing material such as bio-oil may function as a catalyst.

The method may comprise producing the polymerisation agents and a residue through the treatment of the carbonaceous feedstock, such as biomass. The method may also comprise further treating the residue to produce the carbon-containing material capable of undergoing polymerisation and a further material that has pores in which some polymerisation takes place. The residue may also be pyrolysed to produce the carbon-containing material capable of undergoing polymerisation.

In accordance with a second aspect of the present invention, there is provided a method of producing a solid carbon material, the method comprising:

providing a carbon-containing material formed through the heat treatment of carbonaceous feedstock, the carbon-containing material being capable of undergoing polymerisation;

providing a further material having pores;

mixing the carbon-containing material and the further material with a polymerisation agent to form a material mixture; and heating the material mixture to a temperature at which polymerisation of the material mixture occurs so as to produce the solid carbon material, wherein at least some of the polymerisation of the material mixture takes place within the pores of the further material.

In accordance with a third aspect of the present invention, there is provided a system for producing a solid carbon material and the system comprising a polymerisation reactor, the polymerisation reactor comprising:

at least one inlet for providing a material mixture, the material mixture comprising at least a carbon-containing material formed through the heat treatment of carbonaceous feedstock, the carbon-containing material being capable of undergoing polymerisation, and a polymerisation agent;

a reaction region for receiving the material mixture; and a heat source for providing heat to the reaction region;

wherein the material mixture in the reaction region is heated to a temperature at which polymerisation of the material mixture occurs so as to produce the solid carbon material.

The reactor of the system may be arranged to heat the material mixture to a temperature sufficient to carbonise and devolatilise the solid carbon material.

In an embodiment, the polymerisation agent comprises a material having a furan ring, a carbonyl group and/or other reactive functional groups. For example, the polymerisation agent may comprise furfural.

In one embodiment, the carbon-containing material may be provided in the form of a liquid or vapour.

In a further embodiment, the carbon-containing material is condensable.

In a specific embodiment, the carbon-containing material comprises crude, such as bio-crude (with bio-oil being a particular example).

In an embodiment, the material mixture comprises a further material.

The further material may be porous. For example, the further material may comprise carbonaceous particles, such as fine particles from coal or biomass or char obtained from the thermal treatment of carbonaceous feedstock such as biomass, peat, lignite, brown coal, sub-bituminous coal, low-rank bituminous coal or mixtures thereof. However, a person skilled in the art will appreciate that other suitable further materials are envisaged.

If the carbon-containing material and the polymerisation agent are mixed with a porous material, at least some polymerisation of the material mixture and the polymerisation agent may take place within the pores of the further material. The further materials may cross-polymerise with the polymerisation agent and the carbon-containing material. Thus, the pores of the further material may be filled with solidified carbon material.

Additionally or alternatively, the further material may comprise an organic or inorganic additive to produce functionalised carbon materials or carbon composites. For example, an inorganic salt may be added to the material mixture to produce a carbon metal composite. A person skilled in the art will appreciate that other suitable additives are envisaged.

The polymerisation reactor may comprise a plurality of inlets, each inlet being arranged to provide a material component of the material mixture. For example, the polymerisation reactor may comprise a first inlet for providing the carbon-containing material, a second inlet for providing the polymerisation agent and a third inlet for providing the further material. In this embodiment, the polymerisation reactor may comprise a dedicated mixing region for mixing the provided material components. Alternatively, the individual components in the mixture may be premixed before entering the reactor. In the latter case, the polymerisation reactor may be arranged such that the mixture enters the reactor from one inlet.

In an embodiment, the heat source is arranged to heat the reaction region so as to induce the polymerisation.

In an embodiment, the polymerisation reactor is arranged to operate in an inert environment, i.e. oxygen-deficient. In this embodiment, the polymerisation reactor may comprise a gas inlet for receiving an inert gas, such as nitrogen, within the reaction region.

The polymerisation reactor may further be arranged to conduct the carbonisation of the produced solid carbon material. In this regard, the heat source may be arranged to heat the reaction region to a temperature to devolatilise the solid carbon material. In this example, the polymerisation of the material mixture and the further carbonisation of the solid carbon material are conducted within the reaction region. However, a person skilled in the art will appreciate that the polymerisation reactor may comprise a dedicated carbonisation region in which the produced carbon material is further devolatilised. Alternatively, the carbonisation may also be performed in a further vessel that may be connected in tandem.

In an embodiment, a catalyst may be provided in the reaction region. In this way, a rate of the polymerisation of the material mixture may be increased by the catalyst.

The polymerisation reactor may comprise a gas outlet so that gaseous products can exit the polymerisation reactor. Gaseous products may include volatiles that are released during the further carbonisation of the carbon material. The polymerisation reactor may further comprise a collector in fluidal contact with the gas outlet of the polymerisation reactor such that volatiles that exit the polymerisation reactor can be collected. The collected organics may be used for chemical recovery. The non-condensable gaseous products may be used as fuel in a combustor to generate heat for the polymerisation and carbonisation.

In an embodiment, the polymerisation reactor comprises a condenser arranged such that gaseous products such as volatiles that are released during the polymerisation or carbonisation, including unconverted polymerisation agent, can be condensed and recycled back to the reaction region for further reaction.

In an embodiment, the polymerisation reactor is arranged such that a moving mechanism moves the reacting material mixture through and along a length of the reactor. It will be appreciated than the material mixture may flow through the reaction region in any suitable direction. For example, the material mixture may flow in a substantially horizontal direction, in a vertical direction, or in a direction at an inclined angle. In these embodiments, the temperature may increase with the flow direction of the material mixture.

The polymerisation reactor may be operable as a batch reactor, a semi-batch reactor or a continuous reactor.

In accordance with a fourth aspect of the present invention, there is provided a polymerisation reactor arranged to perform the method in accordance with the first and second aspects of the present invention.

In accordance with a fifth aspect of the present invention, there is provided a solid carbon material, a carbon-composite material or a product such as an electrode or activated carbon, produced using the method in accordance with either the first or second aspect of the present invention.

In accordance with a sixth aspect of the present invention there is provided a polymerisation reactor for producing a solid carbon material, the polymerisation reactor comprising:

at least one inlet for providing a material mixture, the material mixture comprising a carbon-containing material formed through the heat treatment of carbonaceous feedstock, the carbon-containing material being capable of undergoing polymerisation, and a polymerisation agent;

a mechanism to move the reacting material mixture through the reactor; and a heat source for providing heat to the reaction region so that the temperature increases along the length of the reactor;

wherein the material mixture in the reactor is heated to a temperature at which polymerisation of the material mixture occurs so as to produce the solid carbon material.

The reactor may be arranged to heat the solid carbon material to a temperature sufficient to carbonise and devolatilise the solid carbon material.

The reactor may comprise a further vessel that is connected in tandem and in which in use the solid carbon material is heated to temperature sufficient to carbonise and devolatilise the solid carbon material.

In accordance with a seventh aspect of the present invention there is provided a method of producing a solid carbon material, the method comprising:

forming a carbon-containing material through the heat treatment of carbonaceous feedstock, the carbon-containing material being capable of undergoing polymerisation and being at an elevated temperature;

cooling the carbon-containing material; and
introducing a polymerisation agent for mixing with the carbon-containing material to form a material mixture, wherein the polymerisation agent is introduced after the carbon-containing material has been cooled to about a temperature required for polymerisation thereof,
whereby polymerisation of the material mixture occurs to produce the solid carbon material.

In one embodiment the cooling of the material mixture prior to and during polymerisation of the material mixture is conducted in an inert environment.

In accordance with an eighth aspect of the present invention there is provided a polymerisation arrangement for producing a solid carbon material, the polymerisation arrangement comprising:
a heat treatment vessel configured to heat treat carbonaceous feedstock to produce a carbon-containing material being capable of undergoing polymerisation, whereby in use the carbon-containing material exits the heat treatment vessel at an elevated temperature;
a polymerisation reactor configured to receive the carbon-containing material and to cool the carbon-containing material as it is conveyed through the polymerisation reactor;
at least one inlet for introducing a polymerisation agent into the polymerisation reactor for mixing with the carbon-containing material to form a material mixture, wherein the inlet is configured in use to introduce the polymerisation agent at a position where the carbon-containing material is at about a temperature required for polymerisation thereof;
whereby polymerisation of the material mixture occurs to produce the solid carbon material.

In one embodiment the heat treatment vessel is a pyrolysis reactor.

The polymerisation arrangement may comprise a heat exchange unit positioned between and in communication with the heat treatment vessel and the polymerisation reactor and being configured o cool or heat the carbon-containing material.

In one embodiment the polymerisation reactor may have a region configured to heat the solid carbon material to a temperature sufficient to carbonise and/or devolatilise the solid carbon material. Alternatively, in another embodiment the polymerisation arrangement may comprise a further vessel connected in tandem wish the polymerisation reactor and being configured to heat the solid carbon material to a temperature sufficient to carbonise and devolatilise the solid carbon material.

BRIEF DESCRIPTION OF THE FIGURES

Embodiments of the present invention will now be described, by way of example only, with reference so the accompanying figures, in which.

DETAILED DESCRIPTION OF AN EMBODIMENT OF THE PRESENT INVENTION

Figure 1:
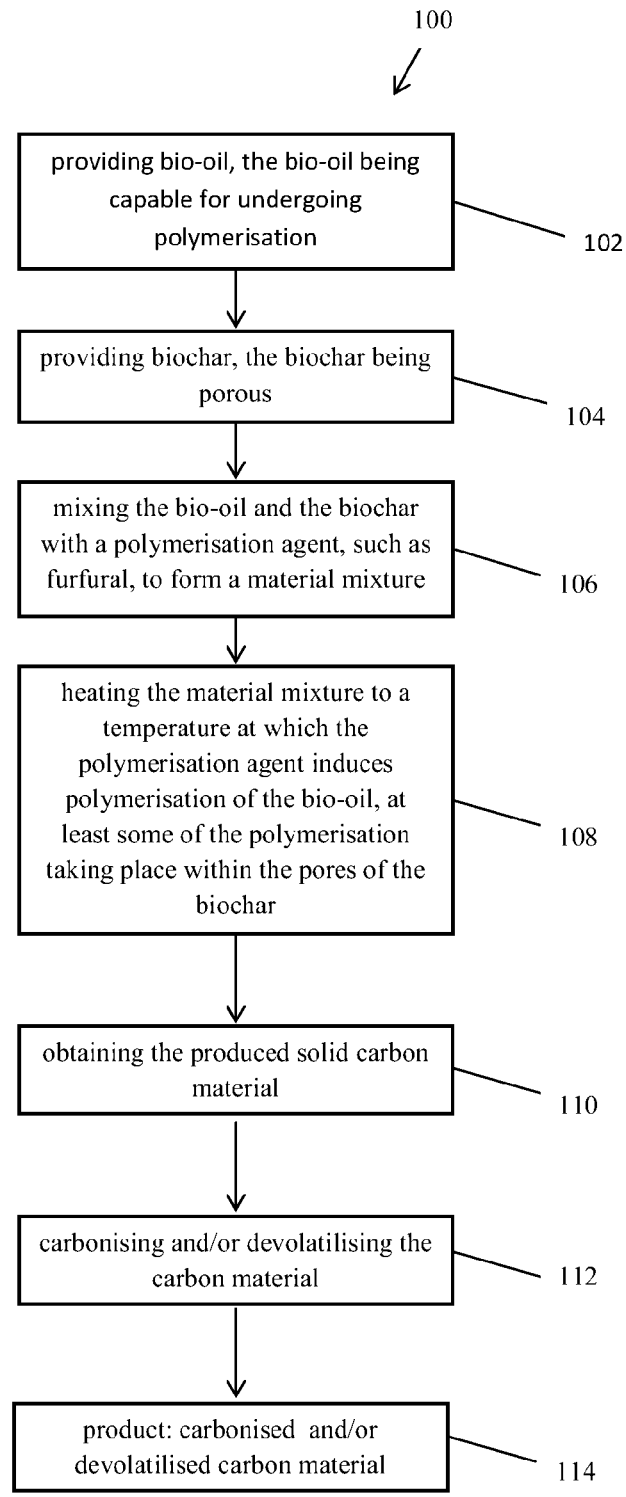
FIG. 1 is a flow diagram of a method of producing a carbon material in accordance with an embodiment of the present invention.

Embodiments of the present invention relate to a method of producing a solid carbon material. For producing the solid carbon material, a carbon-containing material is provided that is formed through the heat treatment of carbonaceous feedstock, wherein the carbon-containing material is capable of undergoing polymerisation. The carbon-containing material may also be referred to a reactant. The carbon-containing material may for example be provided in the form of a liquid.

This carbon-containing material is mixed with a polymerisation agent to form a material mixture. The carbon-containing material and the polymerisation agent may for example be mixed to form a slurry. The material mixture is then heated to a temperature at which the polymerisation agent induces the polymerisation of the carbon-containing material with the polymerisation agent. In this way, the solid carbon material can be produced.

In a specific example, the carbon-containing material comprises a crude liquid, such as bio-oil. The crude liquid may be obtained from the pyrolysis of a carbonaceous feedstock or a mixture of carbonaceous feedstocks. The crude liquid may also be a product from the liquefaction of carbonaceous feedstock under subcritical, critical or supercritical conditions. The carbonaceous feedstock used to prepare the crude liquid may be biomass, municipal wastes, and coal such as peat, lignite, brown coal, sub-bituminous coal, low-rank bituminous coal, anthracite, or their mixtures.

Furthermore, it will be appreciated that just a fraction of the crude liquid may be used to prepare the solid carbon material. One particular example is the use of fractions of bio-oil, the condensable liquid from the pyrolysis of carbonaceous feedstock, as the material for producing the solid carbon material.

The polymerisation agent may comprise a material having a furan ring, a carbonyl group and/or other reactive functional groups. In a specific example, the polymerisation agent comprises furfural. The polymerisation agent may be obtained from the hydrolysis or liquefaction of carbonaceous feedstock, such as biomass. In this case, the polymerisation agent is a mixture of furfural and other components from the hydrolysis or liquefaction of biomass.

The material mixture of bio-crude and polymerisation agent may further be mixed with a further material. In one example, the further material is porous, and at least some polymerisation of the bin-crude takes place within the pores of the further material. Thus, the pores of the further material can be filled with polymerised/solidified carbon material from the bio-crude.

In a specific example, the further material comprises carbonaceous particles. These carbonaceous particles may be obtained from coal or biomass or char obtained from the thermal treatment of carbonaceous feedstock such as biomass, peat, lignite, brown coal, sub-bituminous coal, low-rank bituminous coal, anthracite or mixtures thereof. However, a person skilled in the art will appreciate that other suitable further materials are envisaged.

Considering a specific example in which bio-oil is mixed with furfural as polymerisation agent and biochar as porous further material, the polymerisation of the crude bio-oil together with furfural takes place in the pores of the biochar.

In this way, the pores of the biochar will be at least partly filled with solidified carbon material mainly formed from the polymerisation of bio-oil and furfural. The resulting solid carbon material will have higher mass density and hardness than the initial carbonaceous particles. Furfural and/or the crude bio-oil may also react with the biochar and condense together with the reactive structures in biochar to form cross-links in the final solid carbon material product.

Selecting the carbonaceous particles as the further material for mixing with bio-crude and the polymerisation agent has particular advantages. In particular, the carbonaceous particles have a relatively high carbon content and low volatility. For example, biochar, the solid product from the pyrolysis of biomass, can have a carbon content of above 80%. The carbon exists in bio-char mainly in the form of large aromatic structures. The volatility of this form of carbon is relatively low even at elevated temperatures. However, biochar has excessive pores, due to the release of volatiles from the biomass during pyrolysis, which limit the use of biochar in certain applications, for example as carbon electrode materials, high-strength activated carbons and as a replacement for metallurgical coke.

In this particular example, bio-oil, the bio-crude from pyrolysis, is used to produce the solid carbon material with the aid of the polymerisation agent, which in this example case is furfural. In this way, the carbon content, hardness and density of the carbon materials can be increased. It will be appreciated that even though the specific example is directed to the use of bio-oil, biochar, and furfural to produce the solid carbon material, the material mixture is not limited to these materials. Further suitable material components for the material mixture include coal tar, coal char, a mixture of coal-derived components and biomass derived components, and the like.

In this particular example, the bio-oil and the biochar are obtained from the pyrolysis of biomass. However, it will be appreciated that other sources for the material components of the material mixture are envisaged.

Using biomass for the method of producing a solid carbon material has significant advantages. In particular, biomass is a source of renewable carbon. The solid carbon materials from biomass have a very low carbon footprint to give significant environmental benefits in the short and long terms. Conversion of renewable biomass into the carbon material also has great economic potential due to the numerous applications of the material in the metallurgical industry, water treatment, gold mining or extraction, catalysts making and other carbon material manufacturing industries.

Referring now to FIG. 1, there is shown a flow chart illustrating a method 100 in accordance with a specific embodiment of the present invention.

In a first step 102, a carbon-containing material that is formed through the heat treatment of carbonaceous feedstock and is capable of undergoing polymerisation is provided. In this particular embodiment, the carbon-containing material is bio-oil obtained from the pyrolysis of biomass.

In step 104, a further material is provided. In this particular embodiment, the further material is biochar that is also obtained from the pyrolysis of the biomass. The step of providing the biochar may comprise processing the biochar to provide fine particles. For example, the biochar may be crushed.

Pyrolysis relates to a process of thermal decomposition of biomass by heating in an oxygen-deficient environment. As a consequence, the macro structure in biomass is destroyed to release volatiles in the form of gaseous products and condensable vapours (bio-oil). The residue left is biochar. The obtained biochar has a relatively high porosity and may also be referred to as "light carbon material". A particular example of a pyrolysis process is described in further detail in PCT international patent application No. PCT/AU2011/000741.

In a next step 106, the bio-oil and the biochar are mixed together with a polymerisation agent, such as furfural, to form a material mixture. The mixing may be conducted at room temperature. In this particular example, the mixing is conducted to form a slurry.

The material mixture is then heated in step 108 to a temperature at which the polymerisation agent induces the polymerisation of the bio-oil. In this specific example, some of the polymerisation takes places within the pores of the biochar, in which sizes of the molecules in the bio-oil grow and become solid thereby filling the pores of the biochar. The bio-oil and/or furfural may also cross-link with the biochar structure.

The method is conducted and the polymerisation agent is selected such that, after polymerisation, a residue material related to the polymerisation agent forms a part of the produced solid carbon material.

In a specific example, the material mixture may for example be fed into a reactor where the material mixture is heated. In this regard, the mixing of the material components may be conducted before, during or after feeding the material mixture into the reactor. The reactor may not be filled to the full capacity of its volume to allow space for the expansion of the material mixture at elevated temperatures.

In this example, the temperature at which the polymerisation process is induced is kept below 400° C. For example, the temperature may be selected from a range between 50 and 400° C., wherein the exact temperature depends on the properties of the material mixture. At this relatively mild reaction temperature, gaseous products that are formed in the process are minimised. Without the formation of significant amounts of gaseous products during the polymerisation of the bio-oil, the potential pores in the resulting solid carbon material can be minimised. In a specific example, the temperature may be increased in a step-wise manner together with holding periods of time at pre-selected temperature steps.

In this particular example, the polymerisation process proceeds via the cross-linkage of the small and large molecules in the bio-oil. The bio-oil in the material mixture may contain molecules with oxygen-containing functional groups in the forms of hydroxyl group and carbonyl group. The polymerisation agent participates in or initiates or accelerates the polymerisation process as the polymerisation agent is reactive towards polymerisation at the temperature to which the material mixture is heated. The functional groups of the polymerisation agents play a critical role in the polymerisation reactions. These functional groups may link with other compounds via the formation of new chemical bonds (e.g. C—C, C—O, C=C, C=O bonds) or aromatic ring structures. At the temperature to which the material mixture is heated, these molecules are activated and react with each other, for example, via electrophilic substitution and/or electrophilic addition reactions to condense together. As a result of these condensation processes, the size of at least some of the molecules in the bio-oil increase and the molecules may become more reactive towards condensation. In this way, the organics can grow to bigger size and eventually become solid carbon material obtained in step 110.

Depending on the required properties for the carbon material product, the method 100 may further comprise a step 112 of heating the produced solid carbon material to a further higher temperature to devolatilise (carbonise) the carbon material. Without this further thermal treatment (carbonisation) of the carbon material, the produced carbon material has relatively high oxygen content, which may be due to the relatively high oxygen contents of the bio-oil. Via his further thermal treatment (carbonisation), the oxygen contents of the carbon material can be reduced. Some oxygen-containing functional groups (e.g. in the forms of —CHO or —COOH) attached to the large molecules of the carbon material may react to form and release CO or $CO_2$ via reactions such as decarbonylation or decarboxylation. The carbonisation of the solid carbon will also remove many of its substitutional groups. The released organics may be further processed into valuable chemicals or used as fuels elsewhere.

In a particular example, the produced solid carbon material is heated to a temperature in a range from 400 to 1500° C., wherein the exact temperature depends on the desired properties of the solid carbon material. It should be noted that, due to the release of some volatiles, new pores may be created within the solid carbon material which will consequently lower the density of the carbon material.

In this regard, the produced solid carbon material may take part in a further polymerisation process in which the carbon material (in place of biochar) is mixed with additional bio-oil and the polymerisation agent. With reference to the above described polymerisation process, some of the polymerisation of the bio-oil then takes place within the pores of the carbonised solid carbon material thereby increasing density and hardness of the new solid carbon material product.

Polymerisation and carbonisation may be repeated for one or more cycles depending on the desired properties of the final solid carbon material product.

In another embodiment, method 100 can be utilised without step 104, i.e. the material mixture formed in step 106 comprises the bio-oil from step 102 and a polymerisation agent. The material mixture may be in the form of a liquid or emulsion. In this case, The polymerisation of the bio-oil and the polymerisation agent in step 108 also forms a solid carbon material in the absence of a further material (that is, without the biochar). The solid carbon material can then undergo devolatilisation and/or carbonisation in step 112 to produce a devolatilised and densified carbon material. This devolatilised and densified carbon material can then be used as a further material in place of biochar (in steps 104 and 106) for the polymerisation and carbonisation to be repeated for more cycles. When biochar is not used in method 100, a solid carbon material can be produced that has an ultra-low ash yield.

In yet a further embodiment, where the solid carbon material requires high-strength, for example in water treatment or gold extraction, the carbonisation step 112 may be omitted or the carbonisation temperature may be kept below 800° C. For these particular uses a certain amount of oxygen-containing functionalities would be desirable, whereby the oxygen in the solid carbon material would act as active sites for removal of metals from the water.

Figure 2:
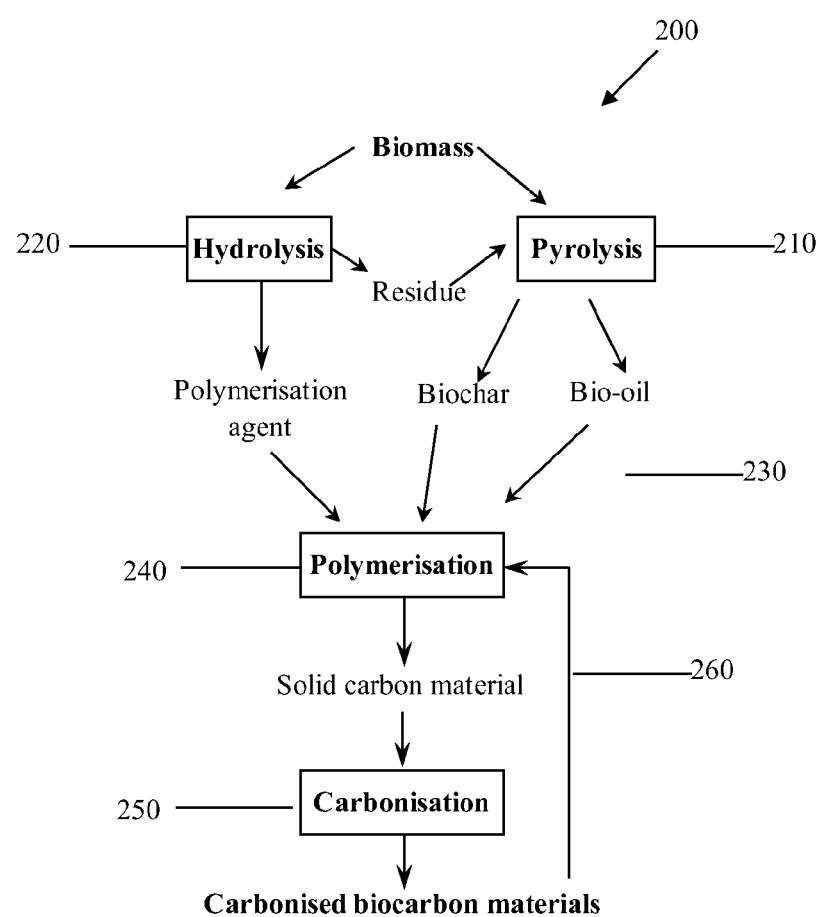
FIG. 2 is a flow diagram of a method of producing a carbon material in accordance with a further embodiment of The present invention.

FIG. 2 shows a flow chart illustrating a method 200 in accordance with a further specific embodiment of the present invention to produce solid carbon materials from carbonaceous feedstock, such as biomass. The method 200 comprises step 210 in which part of the biomass feedstock is used to produce bio-oil and biochar. A suitable method to produce the bio-oil and the biochar from the biomass feedstock is disclosed in PCT international patent application PCT/AU2011/000741.

Biochar is produced as fine particles. Step 220 produces the polymerisation agent using the reminder part of the biomass feedstock.

In this example, the hydrolysis of biomass will produce a polymerisation agent mixture containing furfural and other species. The hydrolysis also produces residues that can also become the feedstock for pyrolysis (step 210). Step 230 then mixes the bio-oil, biochar and the polymerisation agents and step 240 heats up the material mixture and causes polymerisation in order to obtain the solid carbon material. Step 250 then subjects the formed solid carbon material to further carbonisation, i.e. heating up the carbon material to high temperature for devolatilisation. This further carbonised carbon material can be recycled to undergo further cycles of polymerisation and carbonisation, i.e. replacing biochar (steps 230 and 240), until it meets the quality requirement for the final solid carbon material product, especially in terms of density and hardness.

In another alternative embodiment, method 200 can also be carried out without providing biochar into the material mixture in step 230 (similar to the case of method 100).

This produced solid carbon material has various potential applications. In particular, due to its relatively high density and hardness compared to biochar, the solid carbon material may be used as a replacement for the coal-derived metallurgical coke. It should be noted that metallurgical coke formed from coal has a relatively high content of sulphur and a high ash yield, which cause various issues during the steel making process and significantly affect the quality of steel. In comparison, the solid carbon material produced from bio-oil and biochar with an organic polymerisation agent as disclosed herein has a relatively low sulphur content and a relatively low ash yield.

The produced solid carbon material may be used to manufacture catalysts or electrodes for the aluminium industry. The solid carbon material may also be used as a high-strength carbon material for water treatment or for extraction of gold or other metals.

Furthermore, a range of carbon composite materials or carbon materials with specified functionality and property may be produced by mixing the bio-oil and the polymerisation agent with specific organic compounds or inorganic compounds. For example, various organics may be mixed into the bio-oil and the polymerisation agents as the bio-oil contains functional groups with a wide range of polarities. For example, acidic functional groups such as —$SO_3H$ may be introduced into the material mixture and thus be incorporated into the solid carbon material.

Many inorganics may also be dissolved into the mixture of bio-oil and polymerisation agents as the bio-oil has a high content of water, which in some instances amounts to around 30 wt % water. Thus, a range of carbon composites may be produced, such as "metal in carbon", "metal oxides in carbon", and "salt in carbon" materials. For example, inorganic salts such as $Fe(NO_3)_3$, $Ni(NO_3)_3$, $Co(NO_3)_3$ and $Cu(NO_3)_3$ may disperse homogenously in the material mixture of bio-oil and polymerisation agents. In this case, the material mixture may be heated up to the temperature such that the inorganic salt(s) can be merged into the solid carbon material. At elevated temperatures, e.g. 800° C. depending on the type of salts added, these inorganic salts may decompose to metal oxides and can even be reduced to metal by adjacent carbon clusters or by an externally supplied reductant, such as hydrogen. In this way, a "metal in carbon"

composite material may be produced, which is somewhat similar to the traditional carbon supported metal catalysts. However, the metal dispersion in the carbon composite material will be more uniform than that in the traditional catalysts. These materials may potentially be used as catalysts or in other applications.

It should be noted that the method of producing the above mentioned functionalised carbon materials may include the carbonisation at temperatures from 400 to 1500° C., depending on the required properties for the carbon material product.

Figure 3:
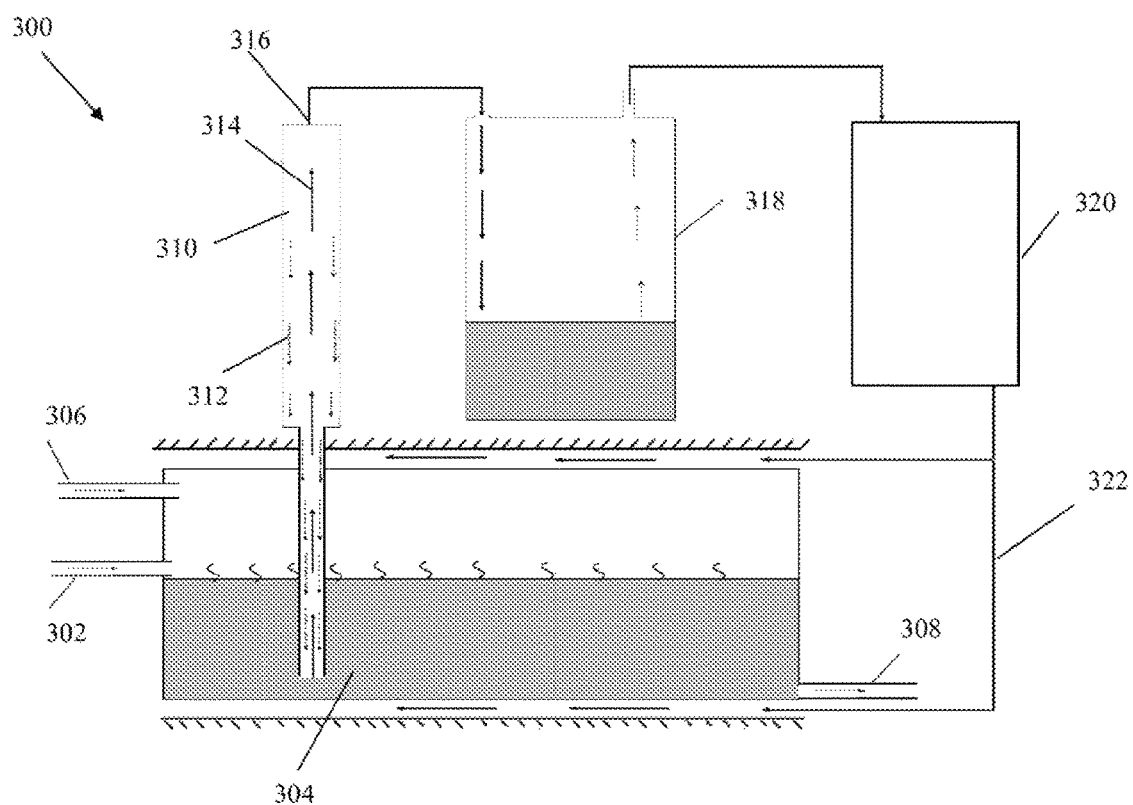
FIG. 3 is a schematic diagram of a polymerisation reactor in accordance with an embodiment of the present invention.

Referring now to FIG. 3, there is shown a polymerisation reactor 300 for producing a solid carbon material.

The polymerisation reactor 300 comprises at least one inlet 302 for providing a material mixture. The material mixture comprises a carbon-containing material that is formed through the heat treatment of carbonaceous feedstock, such as biomass, and is capable of undergoing polymerisation, and a polymerisation agent, such as furfural. The material mixture may comprise a further material, such as fine carbonaceous particles or an additive such as an inorganic salt.

It will be appreciated that the polymerisation reactor 300 may comprise a plurality of inlets. For example, each inlet may provide a material component of the material mixture. In this regard, the polymerisation reactor 300 may further comprise a region for mixing the material components.

The polymerisation reactor 300 further comprises a reaction region in the form of a vessel 304 in which the material mixture is received. The vessel 304 can be heated by a heat source, such as the preheated gas 322 from a combustor 320. For inducing the polymerisation of the carbon-containing material which in this example is bio-oil, the heat source may heat the vessel 304 to a temperature between 50 and 400° C., depending on the properties of the material mixture.

As described above, at least some of the polymerisation of the bio-oil takes place within the pores of the porous material which in this case is biochar.

In this way, a solid carbon material is produced that can be obtained through outlet 308. Alternatively, the solid carbon material product may be discharged by opening the reactor (e.g. the vessel 304).

In this example, the polymerisation of bio-oil takes place within the vessel 304 in an inert environment. For providing an oxygen-deficient environment, the polymerisation reactor comprises a gas inlet 306 for receiving an inert gas within the vessel 304. An exemplary inert gas may be nitrogen. However, other suitable inert gases are envisaged.

In this example, the vessel 304 is initially at atmospheric pressure. However, other conditions are envisaged. Furthermore, the bio-oil and the polymerisation agent within the vessel 304 are possibly volatile. In this case, the generation of vapour pressure at elevated temperatures may be inevitable.

The polymerisation of the bio-oil takes place at relatively low reaction temperature and the molecular sizes of the organics within the bio-oil grow, which in turn reduces the vapour pressure. This allows the temperature of the vessel 304 to continue to increase without creating significant vapour pressure. With a gradual increase of the reaction temperature, the polymerisation of the bio-oil can accelerate.

In a particular example, the temperature of the vessel 304 will be gradually increased. For example, during the initial stages of the polymerisation process, the temperature may be controlled at below 100° C. to avoid high vapour pressure in the polymerisation reactor 300. The holding time of the material mixture within the vessel 304 at below 100° C. may vary over a wide range, e.g. from minutes to hours. At these relatively low reaction temperatures, the polymerisation reactions can still occur. With the progress of the polymerisation process, the temperature will be increased step by step without generating significant vapour pressure. The holding time at different temperatures is varied to leave enough time for the occurrence of the polymerisation reactions.

Maintaining low vapour pressure during the polymerisation process may be an important economical consideration.

A further way of achieving a low vapour pressure would be a pre-treatment of at least components of the material mixture. In the above described example, the vapour pressure mainly comes from the bio-oil in the material mixture. In this regard, the bio-oil may be processed to decrease its volatility before mixing with the polymerisation agent and the carbonaceous particles of the biochar. The light components in bio-oil such as water and small organics may be removed via distillation or other methods. In this way, the pressure within the vessel 304 maybe decreased.

An advantage of a non-pressurised vessel 304 is the low pressure in the polymerisation reactor 300. Since the vessel 304 does not need to sustain significant pressure, the cost in manufacturing the polymerisation reactor 300 will be reduced significantly. Moreover, safety issues associated with operating the polymerisation reactor 300 may also be reduced.

The polymerisation process may be repeated to the extent that a majority of the molecules in the bio-oil that are capable of undergoing polymerisation are solidified. After the solidification of the bio-oil via polymerisation, the temperature of the vessel 304 may further be increased to thermally treat the produced solid carbon material. In this regard, the heat source 320 is arranged to further heat the vessel 304 in which The produced solid carbon material is heated to a temperature of approximately 400 to 1500° C., depending on the desired properties of the final solid carbon material product. In this way, the carbon material can be carbonised to release volatiles.

It will be appreciated that the polymerisation reactor 300 may comprise a further dedicated region for performing the carbonisation of the produced solid carbon material. For example, the carbonisation may be conducted in a second reactor or a second region within the polymerisation reactor that can sustain the higher temperatures. It should be noted that the reaction region for performing the carbonisation may not need to sustain significant pressure. However, conducting both the polymerisation and the carbonisation in one vessel 304 has the advantage that there is no need for moving the carbon material, in particular if the steps of polymerisation and carbonisation are repeated more than one time. It is also possible to carry out the above-mentioned carbonisation in a separate reactor.

It is also envisaged that some lining materials on the reactor surface may be required to prevent the carbon material product from becoming stuck on the reactor wall and causing difficulties in discharging the product.

For released volatiles, for example during the polymerisation process or the carbonisation, the polymerisation reactor 300 comprises a condenser 310. In this particular example, the condenser may use water as the coolant. It should be appreciated that other ways of cooling are also envisaged and considered within the scope of this disclosure. At least some of the released volatiles 312 can be condensed and transferred back into the vessel 304 to take part in the polymerisation process. Volatiles 314 that cannot be condensed can exit the polymerisation reactor 300 through an outlet 316, which then further go through possible chemical recovery in the vessel 318. The gases exiting the vessel 318 may contain combustibles that can form at least part of the fuel for combustion in the combustor 320 to supply the heat to the vessel 304.

In a further embodiment, there is provided a polymerisation reactor. As an example, this is a moving-bed reactor. While the description below is for the reactor to be positioned horizontally, the reactor can also be positioned vertically or any other orientation. In this embodiment, the material mixture, such as the bio-oil, the biochar and the one polymerisation agents, possibly in the form of a flowable slurry, is fed into the polymerisation reactor from a top portion of the polymerisation reactor. Again, the reactor walls may need to be lined to facilitate the transfer of solid materials, especially in the cases that lumps of solid carbon materials are to be produced. Alternatively, the reaction mixture is fed into a chain of individual compartments that move through or circulate around within the polymerisation reactor. The temperature distribution in the polymerisation reactor may not be uniform. The polymerisation reactor may provide a temperature gradient, wherein the temperature increases along the length of the polymerisation reactor from its inlet 302 to its outlet 308. Once the material mixture is fed into the polymerisation reactor, the polymerisation process is induced.

While the material mixture moves along the polymerisation reactor, the material mixture will gradually be heated to higher temperatures and the polymerisation of the material mixture accelerates. In a specific example, the further carbonisation of the solid carbon material takes place in the same reactor. In another further example, the further carbonisation takes place in another separate carbonisation reactor placed in tandem with the polymerisation reactor.

The amount of volatiles generated during polymerisation and carbonisation will depend on the characteristics of the bio-oil, the biochar and the polymerisation agent. The resultant hot gas stream of these volatiles may flow in a jacket outside a portion of the polymerisation reactor to transfer the heat into the reactor to heat up the material mixture to undergo polymerisation. It is envisaged that some additional air may be introduced to burn or partially oxidise the volatiles to generate additional heat and to prevent soot formation. The air flow rate may be controlled to reach the required temperature profile of the polymerisation reactor.

Alternatively, the volatiles can be burned in a combustor to generate a stream of hot gas, which then flows along a jacket outside the polymerisation reactor to supply the heat for the carbonisation and polymerisation reactions.

Figure 4:
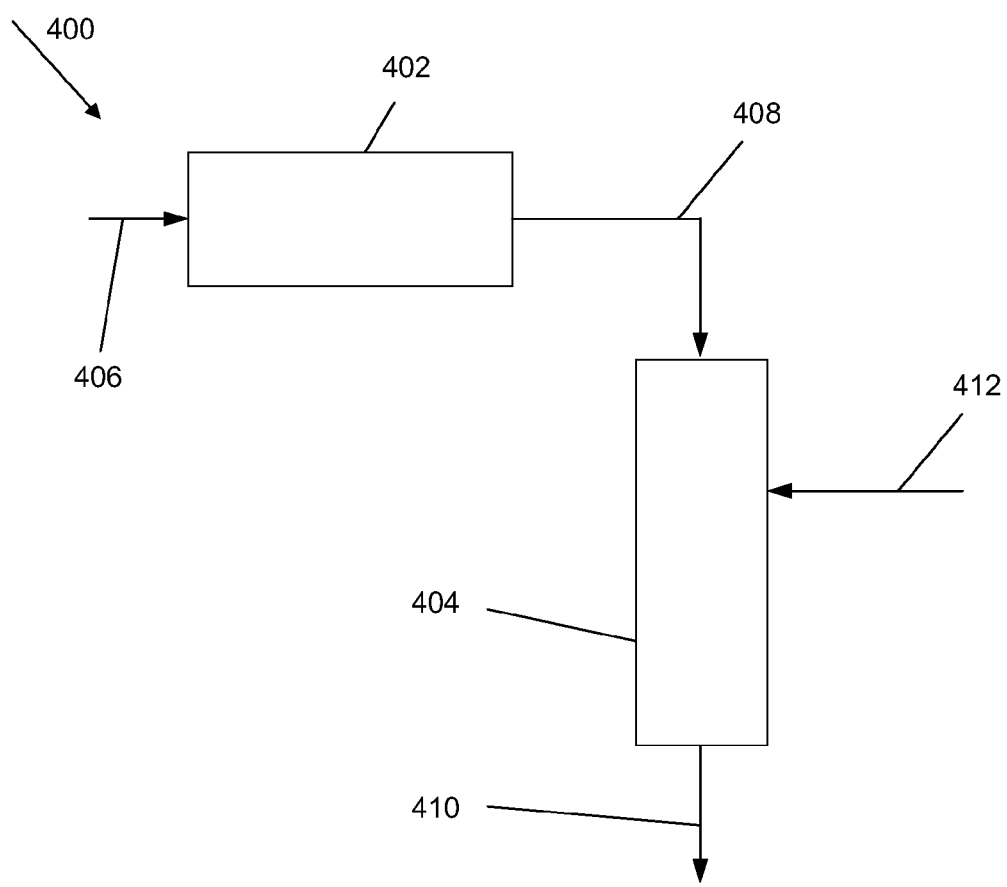
FIG. 4 is a schematic diagram of a polymerisation reactor in accordance with a further embodiment of the present invention.

Referring now to FIG. 4, there is shown a further embodiment of a polymerisation arrangement 400 for producing a solid carbon material.

The polymerisation arrangement 400 comprises a heat treatment reactor 402 and a polymerisation reactor 404. In the exemplary embodiment the heat treatment reactor 402 is a pyrolysis reactor. A particular embodiment of the pyrolysis reactor 402 is described in further detail in PCT international patent application No. PCT/AU2011/000741. A further embodiment of the pyrolysis reactor 402 is described in further detail in PCT international patent application No. PCT/AU2014/001137. It will be appreciated that other types of heat treatment reactors known today or that may be developed in future may also be used.

In use, carbonaceous feedstock, such as biomass, is fed into the pyrolysis reactor 402 through inlet 406 so that it can be pyrolysed. The resultant product from the pyrolysis reactor, comprising a carbon-containing material as described herein, is fed via line 408 to the polymerisation reactor 404. In this regard it will be appreciated that the carbon-containing material exiting the pyrolysis reactor through line 408 is at an elevated temperature (e.g. 450° C.). For example, the carbon-containing material may be a bio-oil vapour. The elevated temperature of the carbon-containing material may be either above or below the temperature required for subsequent polymerisation thereof. Thus the pyrolysis reactor 404 is configured to either heat or cool the carbon-containing material to the temperature required for the polymerisation to be carried out. In one embodiment, an entry to or an initial section of the polymerisation reactor 404 can act as a heat exchanger.

The polymerisation reactor 404 has an outlet 410. The polymerisation reactor 404 may be positioned vertically, horizontally or inclined at an angle. The description below is given for the case where polymerisation reactor 404 is positioned vertically.

A side feed line 412 is configured to introduce a polymerisation agent, such as furfural, into the polymerisation reactor 404 so that the polymerisation agent can form the material mixture for reaction and cause polymerisation of the carbon-containing material.

In a preferred embodiment, side feed line 412 feeds into polymerisation reactor 404 immediately after the carbon-containing material has been cooled or heated up to the required polymerisation temperature.

The side feed line 412 may also introduce a further material, such as fine carbonaceous particles or an additive such as an inorganic salt, into the polymerisation reactor 404. The further material can be fine particles of carbonaceous feedstock, such as coal or biomass, char or mixtures of the carbonaceous feedstock and char. The side feed line 412 may also introduce a catalyst to increase a rate of the polymerisation of the carbon-containing material.

It will be appreciated that the polymerisation reactor 404 may comprise a plurality of side feed lines. For example, each side feed line may introduce a separate material at different locations along the polymerisation reactor 404. The separate material may be a polymerisation agent, further material or an additive and/or catalyst.

In a preferred embodiment, when biomass is fed into the pyrolysis reactor 402, both bio-oil vapour (the carbon-containing material) and biochar (the further material) produced from the pyrolysis of the biomass are transferred via line 408 into the polymerisation reactor 404. Non-condensable gases can also be transferred together therewith.

It will be appreciated that the polymerisation reactor 404 provides a reaction region in which the carbon-containing material can be polymerised. A particular advantage provided by the arrangement 400 is that it eliminates the need to first condense and then reheat the carbon-containing material for the polymerisation to occur. In this regard it will be understood that in the exemplary embodiment the carbon-containing material fed through line 408 into the polymerisation reactor 404 is at an elevated temperature close to or above that required for the polymerisation thereof. By cooling or heating the carbon-containing material, it is possible to introduce the polymerisation agent into the polymerisation reactor 404 in a region at which the carbon-containing material is at the desired temperature for the polymerisation to occur. For example, the polymerisation agent can be introduced into the polymerisation reactor 404 in a region having a temperature between 500° C. and 100° C. so that the polymerisation reaction can occur to produce the solid carbon material while the material mixture is further conveyed through the polymerisation reactor 404 before being exhausted from the polymerisation reactor 404 through outlet 410.

In an alternative embodiment, the polymerisation arrangement 400 is configured to have a dedicated heat exchanging unit located between and in communication with pyrolysis reactor 402 and polymerisation reactor 404 to cool or heat up the carbon-containing material. Polymerisation reactor 404 may be equipped with heat exchanging facilities to maintain the required reaction temperature profile along its length. The solid carbon material product formed in polymerisation reactor 404 may also be cooled in a lower section near the cutlet 410.

Any unreacted materials, such as non-polymerised carbon-containing material and polymerisation agent, that is exhausted through outlet 410 can be separated from the solid carbon material and recycled for reuse.

As described above, at least some of the polymerisation of the bio-oil takes place within the pores of the porous further material which in this case is biochar. In this way, a solid carbon material is produced that can be obtained through outlet 410.

In this example, the polymerisation of bio-oil takes place within the polymerisation reactor 404 in an inert environment.

It is envisaged that the polymerisation reactor 404 will be operated at atmospheric pressure. However, other conditions may also be used.

The polymerisation arrangement 400 may comprise a further vessel for performing carbonisation of the produced solid carbon material. For example, the carbonisation may be conducted in a second reactor that can sustain higher temperatures. In this regard, the second reactor is arranged to further heat the produced solid carbon material to a temperature of approximately 400 to 1500° C. to be carbonised and to release volatiles, wherein the exact temperature depends on the desired properties of the produced solid carbon material.

In an alternative embodiment, polymerisation reactor 404 is configured to carbonise the solid carbon material in a lower section thereof.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method of producing a solid carbon material, the method comprising:
   mixing a polymerisation agent with a liquid or paste of a carbon-containing material that has been produced from the heat treatment of a carbonaceous feedstock and that is capable of undergoing polymerisation to form a material mixture; and
   heating the material mixture to a temperature at which polymerisation of the material mixture occurs so as to produce the solid carbon material.

2. The method of claim 1, wherein the carbon-containing material is formed through pyrolysis or hydrothermal treatment or liquefaction or other thermal treatment of the carbonaceous feedstock.

3. The method of claim 2, wherein the carbonaceous feedstock comprises biomass.

4. The method of claim 1, further comprising the step of mixing the carbon-containing material with a further material that has pores, wherein at least some polymerisation of the material mixture takes place within the pores of the further material.

5. The method of claim 4, wherein the further material comprises an organic or inorganic additive to produce a solid carbon material composite.

6. The method of claim 2, further comprising the step of heating the produced solid carbon material to a temperature at which the solid carbon material is carbonised and/or devolatilised.

7. The method of claim 6, wherein the produced solid carbon material is heated to a temperature between 400° C. to 1500° C.

8. The method of claim 6, wherein the steps of inducing the polymerisation of the material mixture and carbonising the produced solid carbon material are repeated one or more times in an alternating manner to ultimately increase a density of the produced solid carbon material.

9. A method of producing a solid carbon material, the method comprising:
   forming a carbon-containing material from the pyrolysis of carbonaceous feedstock, the carbon-containing material being capable of undergoing polymerisation and being at an elevated temperature;
   cooling the carbon-containing material; and
   introducing a polymerisation agent for mixing with the carbon-containing material to form a material mixture, wherein the polymerisation agent is introduced after the carbon-containing material has been cooled to about a temperature required for polymerisation thereof,
   whereby polymerisation of the material mixture occurs to produce the solid carbon material.

10. The method of claim 9, wherein the carbonaceous feedstock comprises biomass.

11. The method of claim 9, further comprising the step of mixing the carbon- containing material with a further material that has pores, wherein at least some polymerisation of the material mixture takes place within the pores of the further material.

12. The method of claim 11, wherein the further material comprises an organic or inorganic additive to produce a solid carbon material composite.

13. The method of claim 9, wherein the step of cooling the material mixture is conducted in a uniform or in a step-wise manner.

14. The method of claim 9, further comprising producing the polymerisation agent and a residue from heat treatment of the carbonaceous feedstock.

15. The method of claim 14, wherein the residue is further treated to produce the carbon-containing material capable of undergoing polymerisation and to produce a further material that has pores in which some polymerisation takes place.

16. The method of claim 15, wherein the residue is pyrolysed to produce the carbon-containing material capable of undergoing polymerisation.

* * * * *